United States Patent Office 3,556,822
Patented Jan. 19, 1971

3,556,822
CARBONACEOUS BONDING SYSTEM FOR REFRACTORIES
George R. Henry, Bethel Park, and Ernest P. Weaver, Pittsburgh, Pa., assignors to Dresser Industries, Inc., Dallas, Tex., a corporation of Delaware
No Drawing. Filed Feb. 9, 1968, Ser. No. 704,984
Int. Cl. C04b 35/04, 35/52
U.S. Cl. 106—56                                   8 Claims

ABSTRACT OF THE DISCLOSURE

Carbonaceous bonding system for refractories, especially basic refractories, of increased storage life, said system including neutralized unsaturated fatty acid pitch.

BACKGROUND

This invention relates to compositions particularly suited for the formation of refractory monoliths. In one aspect, this invention relates to refractory linings of the type found in oxygen converter vessels.

In certain metallurgical processes, such as in the oxygen steelmaking process which has been variously designated as the LD process, oxygen Bessemer process, oxygen converter process or "Kaldo" process, the basic furnace structure is comprised of a metal skin or shell having a refractory lining interiorly thereof to define the furnace space in which the process is carried out. Generally, the refractory lining of these oxygen steelmaking vessels is comprised of an inner "working" lining of such as tar bonded, chemically bonded, or burned basic brick, an outer lining adjacent the inner wall of the metal shell usually of a burned magnesite brick, and an intermediate layer.

The intermediate layer is usually monolithic, and is formed by such as ramming of a refractory composition in situ. The intermediate layer can vary in thickness, depending on the vessel being lined and the operating parameters to which the lining is to be subjected. It has been suggested that the composition of the intermediate layer be a tar bonded ramming mix. An example of a prior tar bonded ramming mix, which could be useable to form this intermediate layer, is a dead burned dolomite or magnesite or mixture of dolomite and magnesite with additions of such as creosote, furfural, pitch, tar or the like, as the binder.

The invention disclosed in U.S. Pat. 3,256,104 has proven to be quite satisfactory for the above purposes. Now, however, it has become evident, particularly (1) under certain extreme temperature conditions, (2) when subjected to rough handling, and (3) due to uncontrollable but minor chemical variations in the residual material which the unsaturated pitch is, that the bonding system of the patent will "set up" in its shipping container or will lose some of its excellent workability. It is, thus, a primary object of this invention to provide for extending the storage life and workability of unsaturated fatty-acid-pitch-containing carbonaceous bonding systems of the type disclosed and claimed in United States Pat. 3,256,104.

Briefly, according to one aspect of this invention, there is provided a basic refractory ramming mix or brick made from a batch comprised of size-graded, basic refractory aggregate and a nonaqueous, carbonaceous, bonding system. This bonding system is comprised of medium and/or hard pitch, and a neutralized unsaturated, fluid pitch which is derived from the process of distilling linseed fatty acids and soy fatty acids from linseed oil and soy bean oil. Preferably, the total bonding system amounts to between about 3 to 8 parts, by weight, for each 100 parts, by weight, of basic refractory aggregate. 2 to 12 parts is workable. The preferred basic refractory aggregate is selected from the group consisting of dead burned dolomite, dead burned magnesite, and sometimes mixtures thereof. In addition, hard burned lime can be used in combination with dead burned dolomite and dead burned magnesite.

In addition to such materials as medium pitch, hard pitch, and creosote, the prior art has taught the use of such carbonaceous materials as bunker "C" oil, gilsonite, linseed oil, shale tar, asphalt, oil pitches of the type recovered from the distillation and cracking of oils of asphalt, coal, peat, lignite, such materials as heavy water-gas tar, light water-gas tar, oil-gas tar, wood tar, certain types of waxes, and like materials.

Some prior workers, in selecting various materials of the carbonaceous bonding constituents noted above, for both monolith forming mixes and brick mixes, have further suggested the inclusion of lubricating additives, such as petroleum jelly, kerosene, gasoline, benzene, and like petroleum derivatives in order to obtain the desired workability, plasticity, and/or tackiness. Of course, these latter petroleum derivatives considerably increase the danger of explosion and fire. Still other workers have suggested various wetting and dispersing agents which would facilitate formation of aqueous colloidal suspensions or emulsions. It is well known to those skilled in the art that water is an undesirable constituent with mixtures of basic refractory materials, because of hydration and subsequent danger of cracking.

The unsaturated fatty acid pitches used in the practice of this invention are within the group sometimes referred to in the art as "fatty acid pitches," which group designation is generally used to describe residual material obtained in fractional distillation of animal and vegetable materials such as lard, tallow, palm oil, and other vegetable materials, bone fat, garbage and sewage, wool grease, and packing house waste. The residual material which is termed fatty acid pitch is usually a dark brown to black, uniform to lumpy, gritty and thick material substantially free of saturated fatty acids.

Our fatty acid pitches, according to a preferred embodiment, are those obtained from the distillation of linseed and soybean extract to recover linseed fatty acids and soybean fatty acids. These materials are fluid, as distinguished from waxy or soapy, at room temperatures of about 70° F.

The pitches are neutralized by mixing with either an organic or inorganic base. The preferred inorganic base is sodium hydroxide and the preferred organic one is ethanolamine. Of course, any basic material which will neutralize the fatty acid can be used. Thus, considering the organic base, it is of the amine type or a salt thereof. Satisfactory ones include alkylamines or alkylhydroxylamines having from 2 to 22 carbon atoms, preferably in the range of from 2 to 10 carbon atoms, and other bases as set out below. When the organic bases are liquid or semiliquid, they should have a vapor pressure of about 10 mm. of Hg or less at 760 mm. pressure. These organic bases, preferably, are liquid or semisolid at about room temperature and normally, should be liquid or soapy in a temperature ranging from about 70–160° F. Examples of the amines include mono-, di-, and tri-alkyl-substituted amines. Certain ring compounds having an incorporated nitrogen atom are basic in characteristics and are, therefore, usable, including pyridines, quinolines, alkyl-substituted quinolines. Also usable are primary, secondary, and tertiary amines, and certain other mono-, di-, and tri-amines, and which have straight alkyl chains, or a combination of the alkyl or aliphatic chain and cyclic compounds; for example, dimethylphenylamines.

Certain basic organic amine compounds containing nitrogen may also be used, and these include such as purine, etc. The selected amine must be at least weakly basic so it will react with the acid radicals in the fatty acid pitch.

Alkaloids are, also, usable but cost is a limiting factor to their use. Solid quaternary ammonium compounds, which are strong bases capable of neutralizing the acid nature of the pitch, may be used. Other usable organic bases useful for carrying out our invention include diethylamine propylamine, diethylene triamine, triethylene tetramine, tetraethylene pentamine, imino-bispropylamine, dibutyl amine, 2-ethylhexyl amine, di(2-ethylhexyl) amine, etc. In all instances, the compositions are basic, stable and have a low vapor pressure at storage temperatures and pressures. The organic base or salt thereof is one preferably having a dissociation constant ($k_b$) in the range of from $1 \times 10^{-10}$ to $1 \times 10^{-2}$ and preferably about $1 \times 10^{-6}$ to $1 \times 10^{-2}$. The dissociation constant is expressed as the product of the concentrations of the ammonium derivative and hydroxide ions divided by the total concentration of the unionized amine material. The basic strength of the amine is conveniently expressed as the negative logarithm of the basic dissociation constant. Such basic materials must, also, be water soluble at least to the extent in which they are present.

Other usable bases include potassium and ammonium hydroxide. In general, any inorganic base which has a caustic action towards organic matter and changes the color of certain vegetable dyes, such as litmus are usable if they are strong enough to neutralize the fatty acid. Other inorganic bases include alkaline and alkaline earth metal carbonates, alkaline earth metal hydroxides and alkaline metal hydroxides other than those listed above.

The preferred neutralized soybean pitch is usually waxy to soapy at room temperature. Thus, heating is usually advisable to bring this material to a more usable state. As would be expected, the pitches consist essentially of carbon, hydrogen, oxygen and nitrogen atoms.

According to preferred practices, a brick mix or monolith is bonded with the following carbonaceous system:

(1) 1 to 6 parts, per 100 parts, by weight, of refractory of neutralized unsaturated soybean pitch.

(2) 1 to 6 parts, per 100 parts, by weight, of refractory or other carbonaceous materials of various types known to the prior art as listed above.

According to the best mode now known, we use 3 parts of the neutralized soybean pitch per 100 parts, by weight, of basic refractory.

As is understood by those in the art, hard pitch is added to the mix to obtain as much fixed carbon as is commercially feasible. Since our neutralized unsaturated fatty acid pitches do not require solution of the hard pitch for tackiness, one can also use such as graphite or lamp black as the source of the carbon. Gilsonite could also be used.

Further, where little fixed carbon is required, the fatty acid pitches can be used in combination with various polymers, such as acrylics, polyamides, polyesters, epoxies, and the like to obtain a thermosetting bond.

Typical and preferred sizing for refractories according to the invention is as follows:

SCREEN ANALYSIS (TYLER SERIES)

| | Percent, about— |
|---|---|
| ½″ to particles held on a 6 mesh screen | 20 |
| Passing the 6 mesh screen and resting on a 28 mesh screen | 35 |
| Passing a 28 mesh screen | 45 |
| —28 mesh material held on a 325 mesh screen | 40–60 |

NOTE.—Very little of the material, i.e., less than about 5% total, based on the batch weight, is submicron in size.

The preferred refractory grain part of the compositions of this invention is 100% magnesite (or dead burned magnesia as it is more correctly called). Equally satisfactory are mixes of dead burned dolomite and magnesite. Typical analysis of preferred magnesite and dolomite is as follows:

| | Magnesite | Dolomite |
|---|---|---|
| Silica ($SiO_2$) | About 0.7% | About 1.2% |
| Alumina ($Al_2O_3$) | About 0.3% | About 0.8% |
| Iron oxide ($Fe_2O_3$) | do | About 5.0% |
| Lime (CaO) | About 2.3% | About 53.0% |
| Magnesia (MgO) | Remainder, by difference. | About 38.9% |

NOTE.—Very little of the materials, i. l. less than about 5% total based on the batch weight, is submicron in size.

In a broader aspect of the invention, the refractory aggregate used for making our monolith forming mixes and in the brick mixes need not be basic refractory. It is possible to use basic refractory materials other than dead burned magnesia, dead burned dolomite, and lime (calcia); for example, forsterite, olivine, chrome or, and the like. The unique properties of our bonding material also makes them desirable for use with refractory aggregates such as calcined fire clays, ganisters, high alumina materials such as diaspore, Alabama and South American bauxite, kyanite, alumina, and mullite. It can be used with mixtures which include silicon carbide and the like if one so desires, further including zircon, zirconia, and other well known refractory materials used for the manufacture of monolith forming mixes and brick mixes.

In the foregoing discussion, we specifically mentioned the neutralized unsaturated fluid pitches recovered from the distillation of fatty acids from linseed oil or soybean oil. Soybean pitch is the preferred one. It is, of course, understood that neutralized unsaturated pitch residue of the distillation of fatty acids from other vegetable oils are satisfactory for the practice of this invention.

The following tables are indicative of comparative laboratory testing according to the invention.

| Mix: | By weight |
|---|---|
| A | 100 parts magnesite, 3 parts of 2½% acid soybean pitch. |
| B | 100 parts magnesite, 3 parts of completely neutralized soybean pitch. |

Brick were pressed from both batches at 3000 p.s.i. One hundred pound batches were made up for storage tests at room temperature and at 145° F. This work was done at room temperature with Mix A but heating to 250° F. was considered needed for Mix B to liquify the neutralized pitch and render mixing easier.

All brick, from both mixes, A and B, had good strength after drying at 250° F.

After four days in a sack at room temperature, Mix A was observed to have caked—but it was easily granulated and still damp. Mix B had also caked but not as much as A and it was more damp than A. After two days at 140° F., Mix A was dry, compacted and could not be penetrated with a pencil. Mix B, while somewhat compacted, could be penetrated with a pencil and was still somewhat moist.

After seven days at room temperature, Mix A was still slightly damp and a fair ball could be made of it in one's hand. Mix B, after seven days, was damp, showed little or no caking and a good ball could be made of it in one's hand.

After four days at 140° F., Mix B could still be made into a ball although it was almost dry.

The neutralized soybean material used for these tests needed to be heated to increase ease of mixing. We heated it to 250° F. It was a sodium hydroxide neutralized material. In further tests, we used ethanolamine neutralized material which, at room temperature, had the consistency of heavy or viscous chocolate syrup and really couldn't have been called pourable. This was heated to 140 to 150° F. for mixing. Thus, the ethanolamine neutralized material is preferred and the best material now known for the practice of the invention.

In the above discussion, we mentioned "stabilization" of the unsaturated fatty acid pitch. By this we mean the pH is in the range 7 to 14. This can be determined by titration and a pH meter.

In the foregoing discussion, all parts and percentages are by weight, all refractory chemical analyses should be considered but typical and are on an oxide basis, in conformity with the normal practices of reporting the chemical constituents of refractory materials. All sizing is according to the standard Tyler series of screens or sieves, unless specifically noted to the contrary.

Having thus described the invention in detail and with sufficient particularity to enable those skilled in the art to practice it, what is desired to have protected by Letters Patent is set forth in the following claims.

We claim:

1. In refractory batches bonded with selected nonaqueous, carbonaceous bond materials which batches consist essentially of about 100 parts, by weight, of refractory and on the order of 2 to 12 parts, by weight, of the bond material, the improvement comprising said bond material including a neutralized unsaturated fluid pitch, said pitch being the residue recovered from the distillation of vegetable oils to remove fatty acids therefrom which has been reacted with a basic material to provide a pH in the range 7 to 14.

2. The batches of claim 1 in which the fluid pitch is selected from the group consisting essentially of linseed pitch and soybean pitch.

3. The batches of claim 1 in which a portion of the bond material is selected from the group consisting of medium pitch and powdered hard pitch.

4. The batches of claim 1 in which a portion of the bond material is selected from the group consisting of graphite, lamp black, and mixtures thereof.

5. The batches of claim 1 in which the basic material is organic.

6. The batches of claim 5 in which the basic material is ethanolamine.

7. The batches of claim 1 in which the refractory is basic refractory.

8. A formed refractory made from a batch consisting essentially of about 100 parts, by weight, of refractory, and on the order of 2 to 12 parts, by weight, of bond material, said bond material including a neutralized, unsaturated fluid pitch, said pitch being the residue recovered from the distillation of vegetable oils to remove fatty acids therefrom which has been reacted with a basic material to provide a pH in the range 7 to 14.

References Cited
UNITED STATES PATENTS 3,256,104   6/1966   Weaver _____ 106—58
3,370,968   2/1968   Weaver _____ 106—58

JAMES E. POER, Primary Examiner

U.S. Cl. X.R.

106—58, 63